Patented Dec. 27, 1949

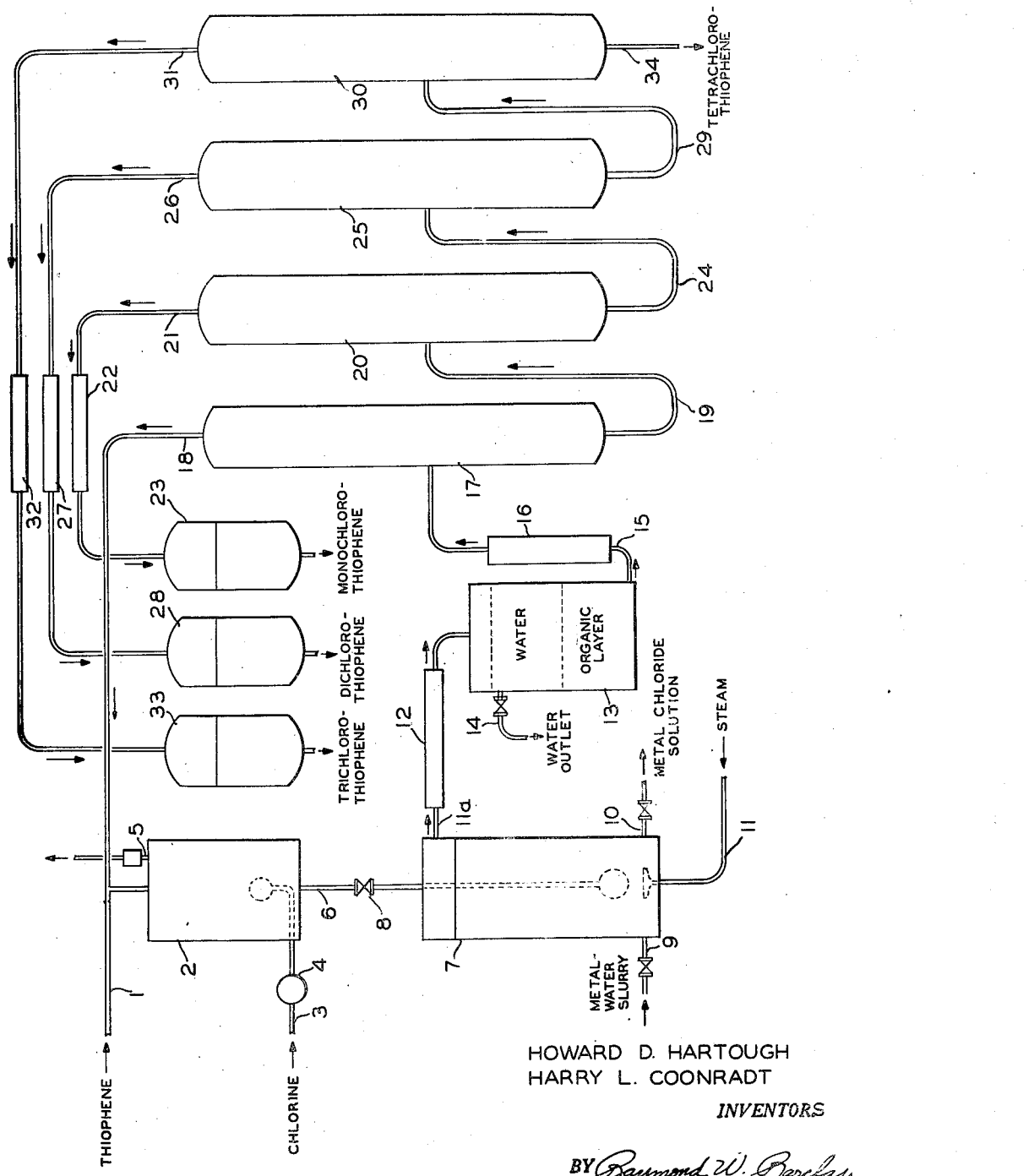

2,492,634

UNITED STATES PATENT OFFICE 2,492,634

PREPARING HALOTHIOPHENES

Howard D. Hartough, Pitman, and Harry L. Coonradt, Woodbury, N. J., assignors to Socony-Vacuum Oil Company, Incorporated, a corporation of New York Application January 31, 1947, Serial No. 725,512

17 Claims. (Cl. 260—329)

This invention relates to a process for preparing pure halogenated derivatives of thiophene or alkylthiophenes. More particularly, the present invention is directed to a method for preparing pure chlorothiophenes, bromothiophenes, and alkyl derivatives thereof.

The direct reaction between thiophene and halogens, such as chlorine or bromine, is well known in the art and proceeds easily and rapidly under normal conditions to yield a thiophene-halogen reaction mixture comprising unreacted thiophene, monohalogenated thiophene and various polyhalogenated thiophenes, the proportion of each being commensurate with the particular degree of halogenation involved. Thus, in the reaction of thiophene with chlorine, chloro-substituted thiophenes obtained in admixture have included monochlorothiophene, dichlorothiophene, trichlorothiophene and tetrachlorothiophene. The amounts of the various chlorothiophenes obtained, along with the amount of unreacted thiophene which can be recovered, are dependent upon the conditions under which the chlorination is effected and particularly upon the relative proportions of thiophene and chlorine which are brought into contact.

Attempts in the past to separate the resulting thiophene-chlorine reaction mixture into the various chlorothiophenes by fractional distillation thereof have led to the evolution of hydrogen chloride in considerable quantity and the chlorothiophenes so obtained, if any, were not pure. To obtain pure chlorothiophenes, the original method, developed over sixty years ago and accredited to Victor Meyer, has heretofore generally been employed. This method involves heating the crude chlorination reaction mixture with alcoholic potassium hydroxide for several hours to destroy hydrogen chloride addition products, followed by addition of water and subsequent steam distillation and fractionation of the mixture so obtained to yield the various chlorothiophenes. A similar method has likewise been employed for the purification of the reaction product of thiophene with bromine.

The above described process, while yielding pure chlorothiophenes, has certain inherent disadvantages which render it inapplicable for the production of chlorothiophenes in commercial quantities. Foremost of these disadvantages is the excessively long heating time of the crude chlorinated thiophene mixture with alcoholic potassium hydroxide. This heating period requires several hours, depending upon the extent to which the thiophene has been chlorinated. Under ordinary conditions of chlorination, the resulting thiophene-chlorine reaction mixture frequently requires a heating period with alcoholic potassium hydroxide of the order of one day in order to insure the complete removal of acid products therefrom. Thus, the process heretofore used for obtaining pure chlorothiophenes has been a slow, time-consuming operation. It is evident that such a process does not readily lend itself to a commercially feasible method for producing pure chlorothiophenes. In addition to being a slow, drawn-out operation, the aforementioned procedure, when carried out on a commercial basis, is unattractive from an economical point of view, since the loss of alcohol or the expense of recovering alcohol from the spent potassium hydroxide solution would greatly increase the overall cost of production. Furthermore, the excessive amount of fuel consumed during the extended heating period of the thiophene-chlorine reaction mixture with alcoholic potassium hydroxide and the labor costs which would be involved during said period render the process totally inadequate as an efficient commercial method for preparing pure chlorothiophenes.

In accordance with the present invention there has now been discovered a method of preparing pure halogenated thiophenes which overcomes the disadvantages inherent in the process heretofore employed. Broadly stated, the process contemplated herein comprises bringing the crude halogen-thiophene or halogen-alkylthiophene reaction mixture into contact with a metal-water slurry, steam-distilling the resulting solution to yield a distillate composed of a water layer and an organic layer, separating the two layers and distilling the organic layer so obtained to effect a fractionation thereof into the various halogenated thiophene derivatives.

It has been found that by carrying out the treatment of crude thiophene-chlorine or thiophene-bromine reaction mixtures according to the above procedure, the excessively long heating periods, such as have heretofore been necessary with the use of alcoholic potassium hydroxide, can be substantially eliminated. The various halogenated thiophenes obtained as a result of the procedure described herein are of a high degree of purity and the process of their preparation represents an efficient, comparatively rapid method in comparison with the time-consuming process of the prior art. Moreover, the method of this invention is a simple procedure for preparing pure chlorinated or brominated thiophenes and is particularly applicable to operations on a large scale, since the economics of the process are extremely attractive. Thus, the method described herein eliminates the use of alcohol, heretofore deemed essential for preparing the potassium hydroxide solution used in the prior art procedure, and consequently dispenses with the need of a recovery system for said alcohol. Also, the process of this invention permits a much greater amount of the pure bromo- or chlorothiophenes to be obtained in a given time as compared with the method heretofore employed. This, in turn, causes a substantial reduction in the expenditure required per unit of pure halothiophene obtained and hence gives rise to a highly economical and efficient method of production.

It is accordingly an object of the present invention to provide an effective process for preparing pure bromo- or chlorothiophenes. Another object is the provision of a process for preparing pure bromo- or chlorothiophenes wherein the extensive heating period necessary to the prior art procedure can be substantially eliminated to provide a rapid, efficient process. A still further object is to afford a process for preparing pure bromo- or chlorothiophenes or alkyl derivatives thereof which is adaptable for commercial production. A very important object is the provision of an economical, continuous method for obtaining pure halogenated derivatives of thiophene or alkylthiophenes from crude reaction mixtures thereof.

These and other objects which will be recognized by those skilled in the art are attained in accordance with the present invention wherein pure halogenated thiophenes or alkylthiophenes are obtained by contacting the crude mixture resulting upon the bromination or chlorination of thiophene or an alkylthiophene with a metal-water slurry and thereafter steam-distilling the resulting solution. The distillate so obtained, composed of a water phase and an organic phase, is then separated and the isolated organic phase fractionated to yield the various halogen derivatives present in substantially pure form.

As pointed out above, the relative amounts of each of the particular chlorothiophenes or bromothiophenes obtained will depend to a large extent upon the degree to which the thiophene is halogenated. Generally speaking, varying amounts of the mono-, di-, tri- and tetrahalogenated derivatives will be obtained under practically all conditions. With a small degree of chlorination or bromination, however, the monohalogenated derivative will be the predominant halogen product. When relatively larger amounts of chlorine or bromine are contacted with thiophene, the dihalogenated product is obtained in substantial yield along with the monohalogenated product. As a general rule, as the degree of halogenation is increased, the yields of tri- and tetrahalogenated thiophenes correspondingly increase in proportion to the amounts of the mono- and di-substituted halogen derivatives. It will thus be understood that the relative amounts of each of the chlorinated or brominated derivatives of thiophene obtained in accordance with the method contemplated herein will largely depend upon the conditions under which the initial halogenation reaction is carried out. Under the usual conditions, thiophene and halogen are contacted at atmospheric pressure and at room temperature or slightly higher. The temperature at which halogenation is effected will be at or below the boiling point of thiophene or alkylthiophene being treated. Thus, in the chlorination or bromination of thiophene, the reaction temperature will generally be between about 0° C. and about 30° C. The halogenation of thiophene may be carried out in any suitable manner wherein the thiophene and halogen are brought into intimate contact. Generally, the gaseous halogen will be bubbled into thiophene or alkyl derivative thereof at a rate which will insure thorough mixing and contact of the two reactants.

The resulting crude chlorination or bromination reaction is then slowly added to a metal-water slurry. The particular metal employed should be sufficiently stable to hot water so that it will not react appreciably with water under the conditions of reaction. Moreover, the metal should be active enough to react with addition products formed during the course of the reaction but be unreactive towards thiophene and/or the halogenated thiophene derivatives present in the halogen reaction mixture. It has been found in accordance with the present invention that generally metals below aluminum and above hydrogen in the electromotive series are applicable for use in the process of the present invention. More specifically, this group of metals includes manganese, zinc, chromium, iron, cadmium, cobalt, nickel, tin, and lead. Of this group, iron and zinc are to be preferred. Generally, the metal will be present preferably in a finely divided form, such as one of the powdered metals. As a general rule, the finer the state of sub-division of the metal contained in the water-metal slurry, the greater will be the ease of removal of undesirable addition products from the reaction product mixture. Addition of the halogen reaction mixture to the metal-water slurry is generally carried out by slowly adding the halogen mixture below the surface of a hot slurry of metal and water. Addition below the surface apparently assures better contact between the constituents and reduces mechanical carry-over. In most instances where the halogenated reaction mixture was not added below the surface of the metal-water slurry, a trace of hydrogen halide was detected in the higher boiling products. Accordingly, a preferred aspect of the present process is the addition of halogenated thiophene mixture to a metal-water slurry below the surface thereof. The amount of the metal contained in the particular slurry employed will vary with the initial degree of halogenation and generally the heavily halogenated thiophene mixtures will require a slurry of higher metal content to completely remove the undesirable halogen or hydrogen halide addition products formed during the course of the reaction. It will, accordingly, be understood that the amount of metal contained in the particular slurry employed herein may vary to a considerable extent, depending on the metal employed and upon the proportion of addition products present in the crude mixture resulting from the halogenation of thiophene or alkylthiophene. It will further be understood that the concentration of metal contained in the metal-water slurry will be such as to remove completely the addition products from the crude halogenation mixture.

The solution resulting upon addition of the halogen-thiophene reaction mixture to the metal-water slurry is then subjected to steam distillation. The steam distillate obtained as a result of said distillation consists of an organic layer and an overlying water layer. The two phases are suitably separated by mechanical means. In some instances the organic layer so obtained is desirably dried to remove traces of water therefrom before being subjected to fractionation. If the separation of organic and water phases is carefully carried out, however, the drying step may be eliminated. Under some circumstances, it may be desirable to carry out the fractionation of the organic steam distillate over alkalis, such as sodium or potassium hydroxide, as a further precaution in removing all traces of hydrogen halide from the distillate. Usually, however, in employing the above-described technique, fractionation over alkalis will not generally be found necessary. Upon fractionation of the organic steam distillate, any unreacted thiophene present is recovered and may be re-used for further halogenation. The halogenated products obtained by fractionation include the mono-, di-, tri- and tetrahalogenated thiophenes in substantially pure form.

The above described process may be used in preparing pure monochlorothiophene, dichlorothiophene, trichlorothiophene, tetrachlorothiophene, monobromothiophene, dibromothiophene, tribromothiophene and tetrabromothiophene. By employing an alkyl derivative of thiophene, such as methyl, ethyl, propyl, butyl, etc., derivatives, the corresponding pure chloro- or bromo-compounds can be prepared. Thus, the process of this invention contemplates the preparation of pure 2-methyl-monochlorothiophene; 2-methyl-monobromothiophene; 2 - methyl - dichlorothiophene; 3 - methyl - trichlorothiophene; 2 - ethyl-monochlorothiophene; 2 - ethyl - trichlorothiophene; 3 - ethyl - dichlorothiophene; 2 - propyl-monobromothiophene; 2 - propyl-trichlorothiophene, and the like.

The process of this invention is particularly adaptable for continuous operation and a suitable apparatus for carrying out a continuous process is shown in the attached drawing wherein thiophene is continuously chlorinated to yield the various chlorinated thiophenes. Referring more particularly to the flow diagram, thiophene is introduced through conduit 1 to reactor 2 and chlorine is introduced through conduit 3 and is permitted to bubble upwards through the downward counterflowing thiophene. The amount of chlorine added to the reactor is measured by a rotameter 4 inserted in line 3. The reactor is furnished with a vent 5 to remove gaseous products produced during the course of the chlorination reaction. The resulting crude thiophene-chlorine reaction mixture flows from the bottom of the reactor through outlet 6 and passes below the surface of a metal-water slurry contained in vessel 7, the rate of flow being suitably controlled by valve 8. A stream of the metallic slurry is supplied to the aforesaid vessel through inlet 9 and the resulting metal chloride solution is withdrawn through outlet 10. Steam is continuously supplied to the mixture of chlorinated thiophene and metal slurry through conduit 11, effecting a steam distillation of the mixture contained in the vessel, and the overhead from said distillation passes through outlet 11a and condenser 12 to settling tank 13 wherein the heavier organic materials contained in the distillate settle to the bottom of the tank while water, being the lighter constituent in the distillate, forms a layer overlying the heavier organic phase. A stream of water is continuously withdrawn from the upper portion of the settling tank through outlet 14 while a stream of the organic layer is withdrawn from the bottom of the settling tank through outlet 15 and passes through a drier 16 to a fractionating tower 17 which is maintained at a temperature such that any unreacted thiophene present in the mixture passes overhead through outlet 18, is condensed, and recycled to the reactor for further chlorination. The bottom product from the fractionating tower 17 passes through outlet 19 to a second fractionating tower 20 which is maintained at such a temperature that monochlorothiophene passes overhead through outlet 21 and condenser 22 to storage tank 23. The bottom product remaining in fractionating tower 20 is withdrawn through outlet 24 and passes through a third fractionating tower 25 which is maintained at a temperature such that dichlorothiophene passes overhead through outlet 26 and condenser 27 to storage tank 28. The bottom product from fractionating tower 25 is withdrawn through outlet 29 and passes through a fourth fractionating tower 30 which is maintained at a temperature such that trichlorothiophene passes overhead through outlet 31 and condenser 32 to storage tank 33. The bottom product from fractionating tower 30 is substantially pure tetrachlorothiophene and may be withdrawn therefrom through outlet 34.

The following examples will serve to illustrate the method of this invention without limiting the same:

*Example 1*

One thousand grams of thiophene (11.9 moles) were reacted at a temperature of about 30° C. with gaseous chlorine until the weight of the reaction mixture was 1515 grams. The chlorine was measured by a rotameter and was equivalent to 1.16 moles of chlorine per mole of thiophene. One thousand grams of the reaction product were added in a slow stream to a hot zinc-water slurry containing 150 grams of zinc powder and 1500 milliliters of water. The mixture was continuously steam-distilled to remove the volatile materials therefrom. The organic phase of the resulting steam distillate was separated, dried over sodium sulfate and fractionated to give the following:

| | Per cent |
|---|---|
| 104 grams thiophene (recovered) | 16 |
| 397 grams monochlorothiophene | 43 |
| 148 grams dichlorothiophene | 12 |

Yields were based on the weight of thiophene used.

*Example 2*

One thousand six hundred eighty-three grams of thiophene (20 moles) were reacted at a temperature of 25–35° C. with gaseous chlorine until 20 moles of chlorine had been added. The weight of the crude reaction product was 2,495 grams. Four hundred grams of this reaction product were added dropwise to a hot slurry of 150 grams of zinc dust and 1,000 milliliters of water, and the volatile materials were continuously steam-distilled therefrom. The organic phase of the resulting steam distillate was separated from the water that had distilled and was then fractionated to give the following:

| | Per cent |
|---|---|
| 57 grams thiophene (recovered) | 21 |
| 193 grams monochlorothiophene | 51 |
| 40 grams dichlorothiophene | 8 |

Yields were based on the weight of thiophene used.

Example 3

One thousand six hundred eighty-three grams of thiophene (20 moles) were reacted at a temperature of 25–35° C. with gaseous chlorine until 20 moles of chlorine had been added. The weight of the crude reaction mixture was 2,495 grams. Four hundred grams of this reaction product were added to a hot slurry of 150 grams of zinc powder and 1500 milliliters of water over a period of 50 minutes, and the volatile materials were continuously steam-distilled therefrom. The organic phase of the resulting steam distillate was separated and collected at about room temperature, passed through a vessel surrounded by a Dry Ice-acetone bath, and then passed through a lead acetate solution. No distillate collected in the vessel surrounded by the Dry Ice-acetone bath, indicating an absence of such volatile gases as would be collected there. A total of 0.4 gram of lead sulfide was formed in the lead acetate solution, indicating a minute amount of rupture of the thiophene ring, leading to hydrogen sulfide formation. The organic distillate was separated, dried over sodium sulfate and fractionated to give the following:

|  | Per cent |
|---|---|
| 62 grams thiophene (recovered) | 22 |
| 182 grams monochlorothiophene | 48 |
| 66 grams dichlorothiophene | 14 |

Yields were based on the weight of thiophene used.

Example 4

One thousand six hundred eighty-three grams of thiophene (20 moles) were reacted at a temperature of 25–35° C. with gaseous chlorine until 20 moles of chlorine had been added. The weight of the reaction product was 2495 grams. Four hundred grams of this reaction product were added to a hot slurry containing 150 grams of iron powder and 1,500 milliliters of water over a period of 1 hour. The volatile material present was continuously steam-distilled from the reaction mixture. The organic phase of the resulting steam distillate was separated, dried over sodium sulfate and fractionated to give the following:

|  | Per cent |
|---|---|
| 52 grams thiophene (recovered) | 19 |
| 178 grams monochlorothiophene | 47 |
| 57 grams dichlorothiophene | 12 |

Yields were based on the weight of thiophene used.

Example 5

One thousand six hundred eighty-three grams of thiophene (20 moles) were reacted at a temperature of 25–35° C. with gaseous chlorine until the weight of the reaction mixture was 2495 grams. The chlorine was measured by a rotameter and the amount of chlorine added was equivalent to 1 mole of chlorine per mole of thiophene. Four hundred grams of the resulting thiophene-chlorine reaction product mixture were heated under reflux with stirring with 1000 grams of a 10 per cent alcoholic potassium hydroxide solution for a period of 24½ hours. The precipitated salt obtained was removed by filtration. The resulting filtrate was diluted with water and the organic material which separated was removed. The remaining water layer was extracted twice with petroleum ether and the extracts so obtained were added to the organic material. The organic materials were then dried over sodium sulfate and fractionated to give the following:

|  | Per cent |
|---|---|
| 40 grams thiophene (recovered) | 14 |
| 162 grams monochlorothiophene | 43 |
| 70 grams dichlorothiophene | 14 |

Yields were based on the weight of thiophene used.

It is to be noted, in comparing the results of the examples illustrating the method of the present invention with the process previously used, as illustrated by Example 5, that in order to obtain substantially the same yields of products, it was necessary, in using the prior art method, to treat the crude chlorination mixture with alcoholic potassium hydroxide for an extended period. This excessively long heating period has been eliminated by the method of this invention, thereby providing a rapid and efficient procedure for preparing pure halothiophenes.

We claim:

1. A method of preparing pure halogenated derivatives of a material selected from the group consisting of thiophene and alkylthiophene, comprising contacting said material with a halogen selected from the group consisting of chlorine and bromine, adding the resulting halogenated mixture to a slurry of water and a metal lying below aluminum and above hydrogen in the electromotive series, steam-distilling the mixture so obtained, separating the water phase of the resulting distillate from the organic phase and fractionating said organic phase to yield pure halogenated derivatives.

2. A method of preparing pure halogenated derivatives of a material selected from the group consisting of thiophene and alkylthiophene, comprising contacting said material with a halogen selected from the group consisting of chlorine and bromine, adding the resulting halogenated mixture below the surface of a slurry of water and a metal lying below aluminum and above hydrogen in the electromotive series, steam-distilling the mixture so obtained, separating the water phase of the resulting distillate from the organic phase and fractionating said organic phase to yield pure halogenated derivatives.

3. A method of preparing pure halogenated derivatives of a material selected from the group consisting of thiophene and alkylthiophene, comprising contacting said material with a halogen selected from the group consisting of chlorine and bromine, adding the resulting halogenated mixture to a slurry of water and zinc, steam-distilling the mixture so obtained, separating the water phase of the resulting distillate from the organic phase and fractionating said organic phase to yield pure halogenated derivatives.

4. A method of preparing pure halogenated derivatives of a material selected from the group consisting of thiophene and alkylthiophene, comprising contacting said material with a halogen selected from the group consisting of chlorine and bromine, adding the resulting halogenated mixture to a slurry of water and iron, steam-distilling the mixture so obtained, separating the water phase of the resulting distillate from the organic phase and fractionating said organic phase to yield pure halogenated derivatives.

5. A method of making pure chlorothiophenes, comprising contacting a material selected from the group consisting of thiophene and alkylthiophene with chlorine, adding the resulting chlorinated mixture to a slurry of water and a metal lying below aluminum and above hydrogen in the electromotive series, steam-distilling the mixture so obtained, separating the water phase of the resulting distillate from the organic phase and fractionating said organic phase to yield pure chlorinated derivatives.

6. A method of making pure chlorothiophenes, comprising contacting a material selected from the group consisting of thiophene and alkylthiophene with chlorine, adding the resulting chlorinated mixture below the surface of a slurry of water and a metal lying below aluminum and above hydrogen in the electromotive series, steam-distilling the mixture so obtained, separating the water phase of the resulting distillate from the organic phase and fractionating said organic phase to yield pure chlorinated derivatives.

7. A method of making pure chlorothiophenes, comprising contacting a material selected from the group consisting of thiophene and alkylthiophene with chlorine, adding the resulting chlorinated mixture to a slurry of water and zinc, steam-distilling the mixture so obtained, separating the water phase of the resulting distillate from the organic phase and fractionating said organic phase to yield pure chlorinated derivatives.

8. A method of making pure chlorothiophenes, comprising contacting a material selected from the group consisting of thiophene and alkylthiophene with chlorine, adding the resulting chlorinated mixture to a slurry of water and iron, steam-distilling the mixture so obtained, separating the water phase of the resulting distillate from the organic phase and fractionating said organic phase to yield pure chlorinated derivatives.

9. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into a slurry of water and a metal lying below aluminum and above hydrogen in the electromotive series, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure halogenated derivatives of the initial thiophene reactant.

10. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into a slurry of water and a metal lying below aluminum and above hydrogen in the electromotive series, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, recycling said constituent to further contact with halogen, fractionally distilling the bottom product from the aforesaid fractionation to yield pure halogenated derivatives of the initial thiophene reactant.

11. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture below the surface of a slurry of water and a metal lying below aluminum and above hydrogen in the electromotive series, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure halogenated derivatives of the initial thiophene reactant.

12. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into a slurry of water and zinc, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure halogenated derivatives of the initial thiophene reactant.

13. A continuous process of preparing pure halogenated derivatives of a thiophene reactant selected from the group consisting of thiophene and alkylthiophene, comprising continuously contacting said material with a halogen selected from the group consisting of chlorine and bromine, flowing a stream of the resulting halogenated mixture into a slurry of water and iron, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure halogenated derivatives of the initial thiophene reactant.

14. A continuous process of preparing pure chlorothiophenes, comprising continuously contacting a material selected from the group consisting of thiophene and alkylthiophene with chlorine, flowing a stream of the resulting chlorinated mixture into a slurry of water and a metal lying below aluminum and above hydrogen in the electromotive series, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure chlorinated derivatives of the initial thiophene reactant.

15. A continuous process of preparing pure chlorothiophenes, comprising continuously contacting a material selected from the group consisting of thiophene and alkylthiophene with chlorine, flowing a stream of the resulting chlorinated mixture below the surface of a slurry of water and a metal lying below aluminum and above hydrogen in the electromotive series, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure chlorinated derivatives of the initial thiophene reactant.

16. A continuous process of preparing pure chlorothiophenes, comprising continuously contacting a material selected from the group consisting of thiophene and alkylthiophene with chlorine, flowing a stream of the resulting chlorinated mixture into a slurry of water and zinc, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure chlorinated derivatives of the initial thiophene reactant.

17. A continuous process of preparing pure chlorothiophenes, comprising continuously contacting a material selected from the group consisting of thiophene and alkylthiophene with chlorine, flowing a stream of the resulting chlorinated mixture into a slurry of water and iron, continuously steam-distilling the resulting mixture and condensing the overhead ensuing therefrom to yield an organic distillate with an overlying water layer, withdrawing a stream of said organic distillate and fractionating the same to recover unreacted thiophene constituent therefrom, fractionally distilling the bottom product from the aforesaid fractionation to yield pure chlorinated derivatives of the initial thiophene reactant.

HOWARD D. HARTOUGH.
HARRY L. COONRADT.

REFERENCES CITED

The following references are of record in the file of this patent:

Ber., 17, 794–5 (1884) 19, 650 (1886).

Weygand, "Organic Preparations," page 77. Interscience Publishers, 1945.